US008924353B1

(12) United States Patent
Patwardhan et al.

(10) Patent No.: US 8,924,353 B1
(45) Date of Patent: Dec. 30, 2014

(54) SYSTEMS AND METHODS FOR COPYING DATABASE FILES

(75) Inventors: Kedar Patwardhan, Pune (IN); Sanjay Jain, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 126 days.

(21) Appl. No.: 13/291,753

(22) Filed: Nov. 8, 2011

(51) Int. Cl.
*G06F 17/30* (2006.01)
(52) U.S. Cl.
CPC ................................. *G06F 17/30073* (2013.01)
USPC ......................................................... 707/640
(58) Field of Classification Search
CPC .................... G06F 17/30206; G06F 17/30197; G06F 17/30123; G06F 17/3015; G06F 17/30073; G06F 17/30082; G06F 17/30076
USPC ......... 707/827, 646, 822, 609, 624, 747, 770, 707/821
See application file for complete search history.

(56) References Cited

U.S. PATENT DOCUMENTS

| 5,333,316 | A | * | 7/1994 | Champagne et al. | ... 707/999.008 |
| 5,719,983 | A | * | 2/1998 | Henderson et al. | ........... 386/265 |
| 2005/0033878 | A1 | * | 2/2005 | Pangal et al. | ................... 710/36 |

OTHER PUBLICATIONS

Dell Equallogic; Microsoft SQL Server; http://www.equallogic.com/partnerships/default.aspx?id=6479; Taken from site on Sep. 6, 2011.
Dell Equallogic; Technical Report, SQL Server Data Protection with Auto-Snapshot Manager; EqualLogic, Inc.; Sep. 2001.
Equallogic; SQL Server Advanced Protection and Fast Recovery with Equallogic Auto-Snapshot Manager; EqualLogic, Inc.

* cited by examiner

*Primary Examiner* — Hosain Alam
*Assistant Examiner* — Johnese Johnson
(74) *Attorney, Agent, or Firm* — ALG Intellectual Property, LLC

(57) ABSTRACT

A computer-implemented method for copying database files may include (1) identifying a request to copy a database file to a target location, and in response to identifying the request to copy the database file to the target location, (2) identifying a preallocated but unused portion of the database file, (3) transmitting a used portion of the database file to the target location, and (4) transmitting a metadata representation of the unused portion of the database file to the target location, the metadata representation being smaller than the unused portion. Various other methods and systems are also disclosed.

20 Claims, 7 Drawing Sheets

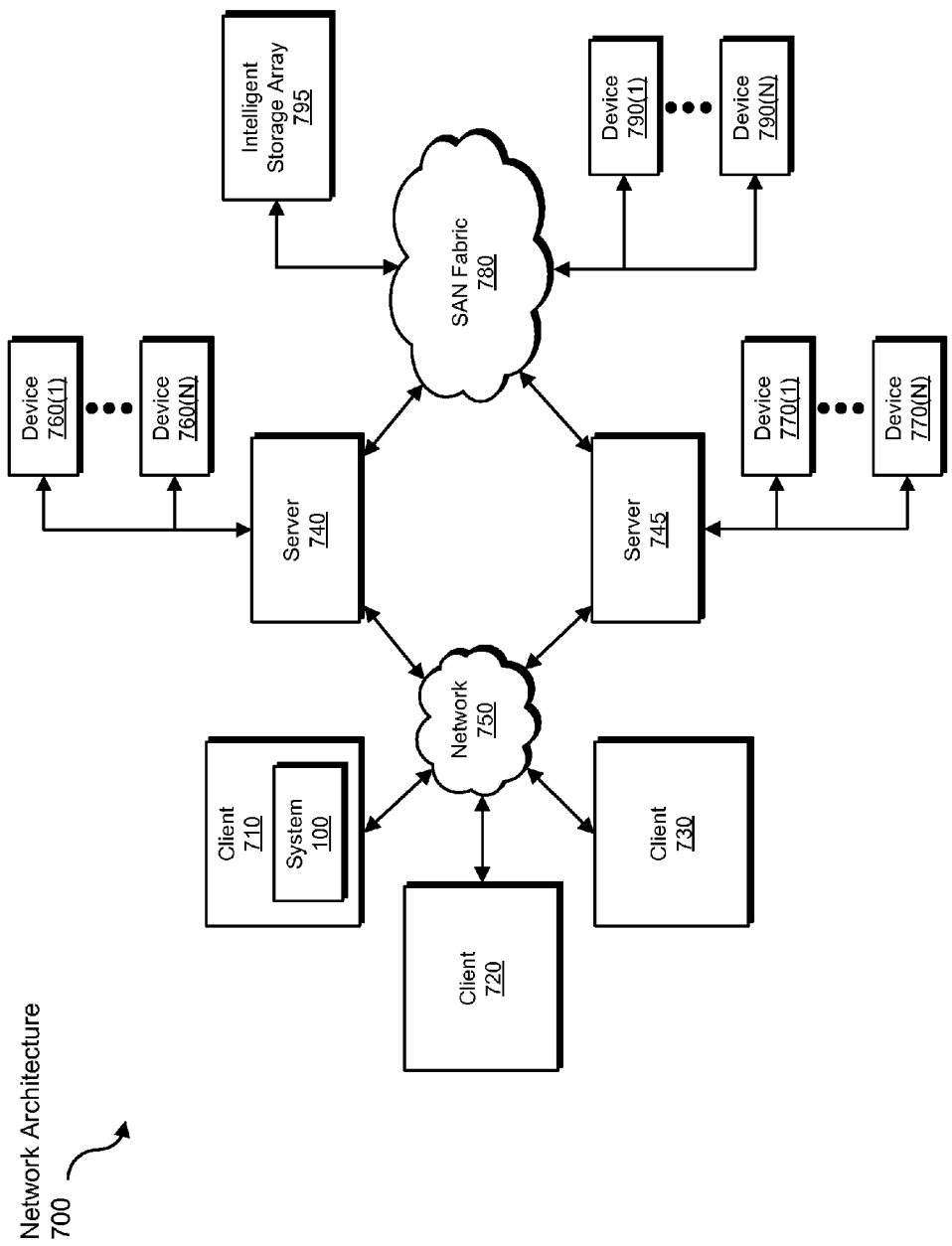

SYSTEMS AND METHODS FOR COPYING DATABASE FILES

BACKGROUND

In the digital age, organizations must manage increasingly large volumes of data. Some organizations may store data within databases to structure and/or organize their data. As an organization adds more data to a database, the corresponding database file may need to grow to accommodate the additional data. However, dynamically changing the size of a database file may cause fragmentation and negatively impact the performance of a database system.

In order to prevent and/or reduce fragmentation, a database system may allow an administrator to preallocate space for a database file. By preallocating large quantities of space for the database file, the administrator may facilitate future growth of the database without unwanted fragmentation. However, preallocated space within database files may impose other costs on computing infrastructures. For example, in the course of managing, preserving, and/or protecting data stored in databases, an administrator may wish to back up, restore, replicate, and/or otherwise copy a database file. Unfortunately, copying a large database file with preallocated space may consume more computing resources than copying a smaller database file without preallocated space. Accordingly, the instant disclosure identifies and addresses a need for additional and improved systems and methods for copying database files.

SUMMARY

As will be described in greater detail below, the instant disclosure generally relates to systems and methods for copying database files by copying used portions of database files along with metadata representations of the unused, preallocated portions. In one example, a computer-implemented method for copying database files may include (1) identifying a request to copy a database file to a target location, and in response to identifying the request to copy the database file to the target location, (2) identifying a preallocated but unused portion of the database file, (3) transmitting a used portion of the database file to the target location, and (4) transmitting a metadata representation of the unused portion of the database file to the target location, the metadata representation being smaller than the unused portion.

In some examples, identifying the request may include identifying a request to perform an online migration of the database file to the target location. Additionally or alternatively, identifying the request may include identifying a request to (1) back up the database file to the target location, (2) restore the database file to the target location, and/or (3) replicate the database file to the target location.

Identifying the preallocated but unused portion of the database file may include any of a variety of steps. For example, identifying the preallocated but unused portion may include identifying a list of free extents within the database file. Additionally or alternatively, identifying the preallocated but unused portion may include (1) querying a database system for a list of unused blocks within the database file, (2) identifying a block size used by the database, and (3) converting the list of unused blocks to a list of free extents within the database file based on the block size.

In one example, the computer-implemented method may also include generating a time estimate for migrating the database file to the target location based on a size of the used portion of the database file. In some examples, transmitting the metadata representation of the unused portion of the database file to the target location may include embedding the metadata representation within the database file.

In one example, an additional computer-implemented method for copying database files may include: (1) identifying a request to write a database file to a target location, (2) receiving data representing the database file, the data including a used portion of the database file and a metadata representation of a preallocated but unused portion of the database file, the metadata representation being smaller than the unused portion, and (3) storing, based on the data, a representation of the database file at the target location.

In some examples, storing the representation of the database file at the target location may include storing the data at the target location. Additionally or alternatively, storing the representation of the database file at the target location may include reconstructing the database file at the target location by writing the used portion of the database file and allocating the unused portion within the database file based on the metadata representation.

In one embodiment, a system for implementing the above-described method may include: (1) an identification module programmed to identify a request to copy a database file to a target location, (2) a preparation module programmed to, in response to identifying the request to copy the database file to the target location, identify a preallocated but unused portion of the database file, and (3) a transmission module programmed to, in response to identifying the request to copy the database file to the target location, (i) transmit a used portion of the database file to the target location and (ii) transmit a metadata representation of the unused portion of the database file to the target location, the metadata representation being smaller than the unused portion. The system may also include at least one processor configured to execute the identification module, the preparation module, and the transmission module.

As will be explained in greater detail below, by copying used portions of database files along with metadata representations of the unused, preallocated portions, the systems and methods described herein may backup, restore, replicate, migrate, and/or otherwise copy database files more efficiently by reading, transmitting, and/or writing only those portions of the database files necessary to faithfully represent and/or reconstruct the database files.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 7 is a block diagram of an exemplary computing network capable of implementing one or more of the embodiments described and/or illustrated herein.

Figure 1:
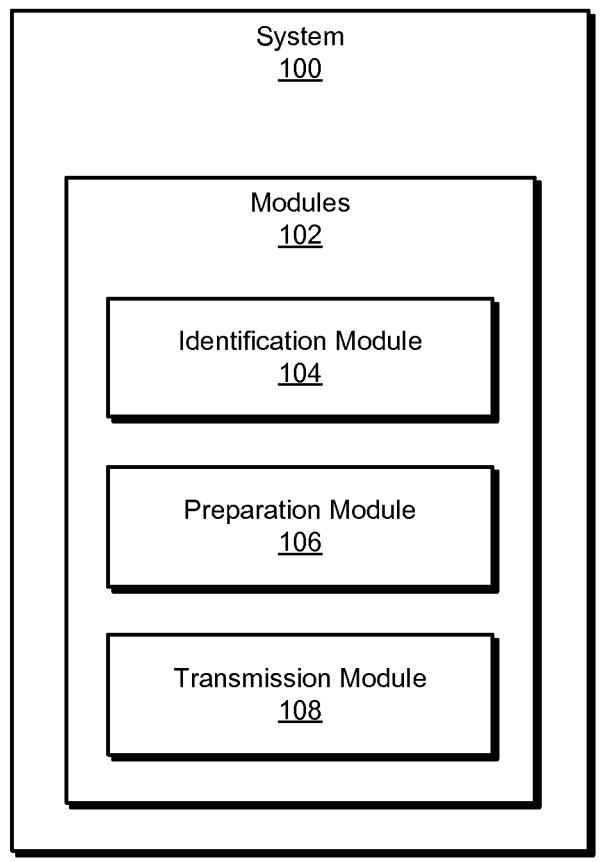
FIG. 1 is a block diagram of an exemplary system for copying database files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
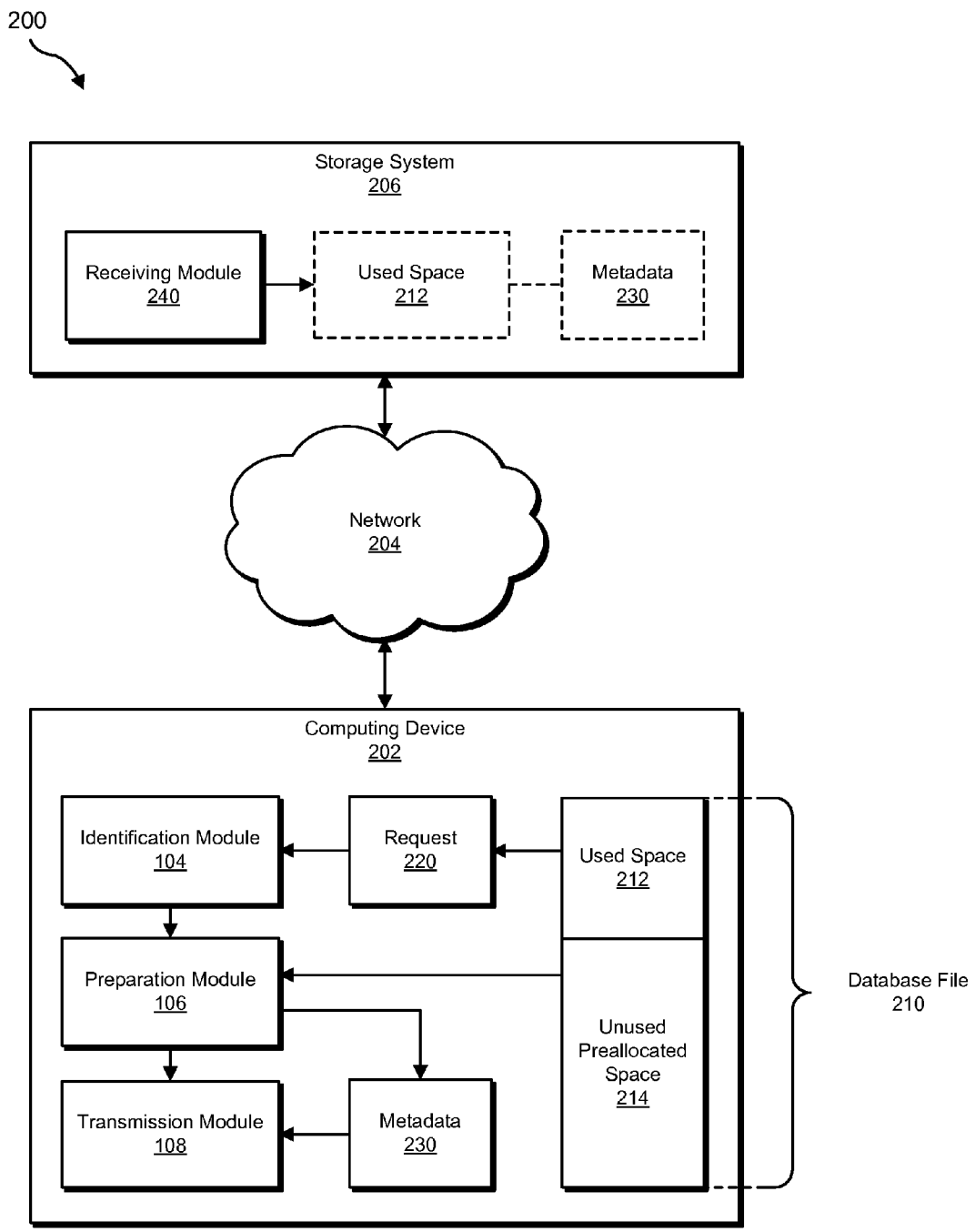
FIG. 2 is a block diagram of an exemplary system for copying database files.

The following will provide, with reference to FIGS. 1-2, detailed descriptions of exemplary systems for copying database files. Detailed descriptions of corresponding computer-implemented methods will also be provided in connection with FIGS. 3 and 5. Detailed descriptions of an exemplary database will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for copying database files. As illustrated in this figure, exemplary system 100 may include one or more modules 102 for performing one or more tasks. For example, and as will be explained in greater detail below, exemplary system 100 may include an identification module 104 programmed to identify a request to copy a database file to a target location. Exemplary system 100 may also include a preparation module 106 programmed to, in response to identifying the request to copy the database file to the target location, identify a preallocated but unused portion of the database file.

In addition, and as will be described in greater detail below, exemplary system 100 may include a transmission module 108 programmed to (1) transmit a used portion of the database file to the target location and (2) transmit a metadata representation of the unused portion of the database file to the target location, the metadata representation being smaller than the unused portion. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or storage system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a storage system 206 via a network 204.

In one embodiment, one or more of modules 102 from FIG. 1 may, when executed by at least one processor of computing device 202, facilitate computing device 202 in copying database files. For example, and as will be described in greater detail below, one or more of modules 102 may cause computing device 202 to (1) identify a request (e.g., a request 220) to copy a database file (e.g., a database file 210) to a target location (e.g., a storage system 206), and, in response to identifying the request to copy the database file to the target location, (2) identify a preallocated but unused portion of the database file (e.g., an unused preallocated space 214 of database file 210), (3) transmit a used portion of the database file (e.g., a used space 212 of database file 210) to the target location, and (4) transmit a metadata representation of the unused portion of the database file (e.g., metadata 230 representing unused preallocated space 214) to the target location, the metadata representation being smaller than the unused portion.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Storage system 206 generally represents any type or form of computing device that is capable of receiving and/or storing data. Examples of storage system 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and storage system 206.

Figure 3:
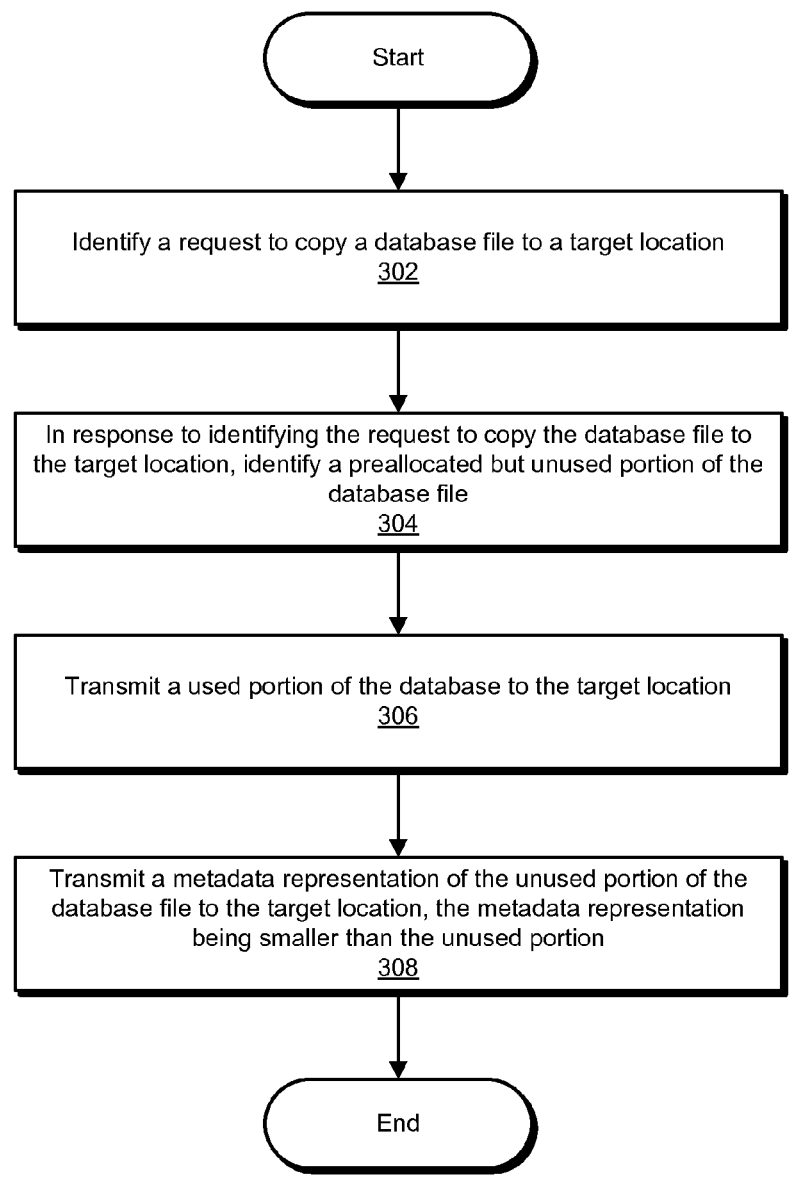
FIG. 3 is a flow diagram of an exemplary method for copying database files.

FIG. 3 is a flow diagram of an exemplary computer-implemented method 300 for copying database files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a request to copy a database file to a target location. For example, at step 302 identification module 104 may, as part of computing device 202 in FIG. 2, identify request 220 to copy database file 210 to storage system 206.

As used herein, the term "database" may refer to any system and/or data structure for storing and/or associating data. Accordingly, the phrase "database file" may refer to any file used for storing such data. In some examples, the database file may store one or more relational database tables.

The request may include any of a variety of types of requests. For example, identification module 104 may identify the request by identifying a request to perform an online migration of the database file to the target location. As used herein, the term "migrate" may refer to copying and/or moving a file to a different file system in any of a variety of contexts. For example, an administrator may migrate files from one file system to another in order to change file system types. Accordingly, as used herein the phrase "online migration" may refer to any instance of copying and/or moving files from a source file system to a target file system while allowing access to the source file system at least until the files are available for use on the target file system. In addition, the phrase "file system," as used herein, may refer to any system for organizing, managing, and/or storing files.

In some examples, the request to copy the database file may include a request to back up the database file. For example, identifying module 104 may identify a request to back up the database file to the target location. As used herein, the phrase "back up" may refer to any procedure to protect and/or preserve data (e.g., as it existed at a given point of time) for any of a variety of purposes (e.g., to later restore the data, to facilitate a search and/or inspection of the data as it existed at the time of backup, etc.). In some examples, the request to copy the database file may include a request to restore the database file to the target location. For example, the database file may exist as a part of a backup, and the target location may represent an original location of the database file. In another example, the request to copy the database file may include a request to replicate the database file. As used herein, the term "replication" may refer to any scheme for maintaining an up-to-date copy of one or more data objects. For example, the database file may be configured for replication to the target location in order to improve the reliability of accessing the database file.

In some examples, the request to copy the database file may entail a request to move the database file. For example, the request to copy the database file to the target location may include a request to create a copy of the database file at the target location while removing the database file from its original location. Accordingly, identification module 104 may identify the request by identifying a request to move the database file to the target location.

Identification module 104 may identify the request in any of a variety of contexts. For example, identification module 104 may operate as a part of a migration, backup, restoration, and/or copying application and receive the request. Additionally or alternatively, identification module 104 may operate as a part of a file system filter driver and intercept one or more requests and/or operations to copy the database file to the target location. In some examples, identification module 104 may identify the request by accessing a configuration repository (e.g., by reading a schedule in a configuration file specifying when the database file is to be copied). Generally, identification module 104 may identify any information indicating an instruction, attempt, and/or plan to copy the database file.

Figure 4:
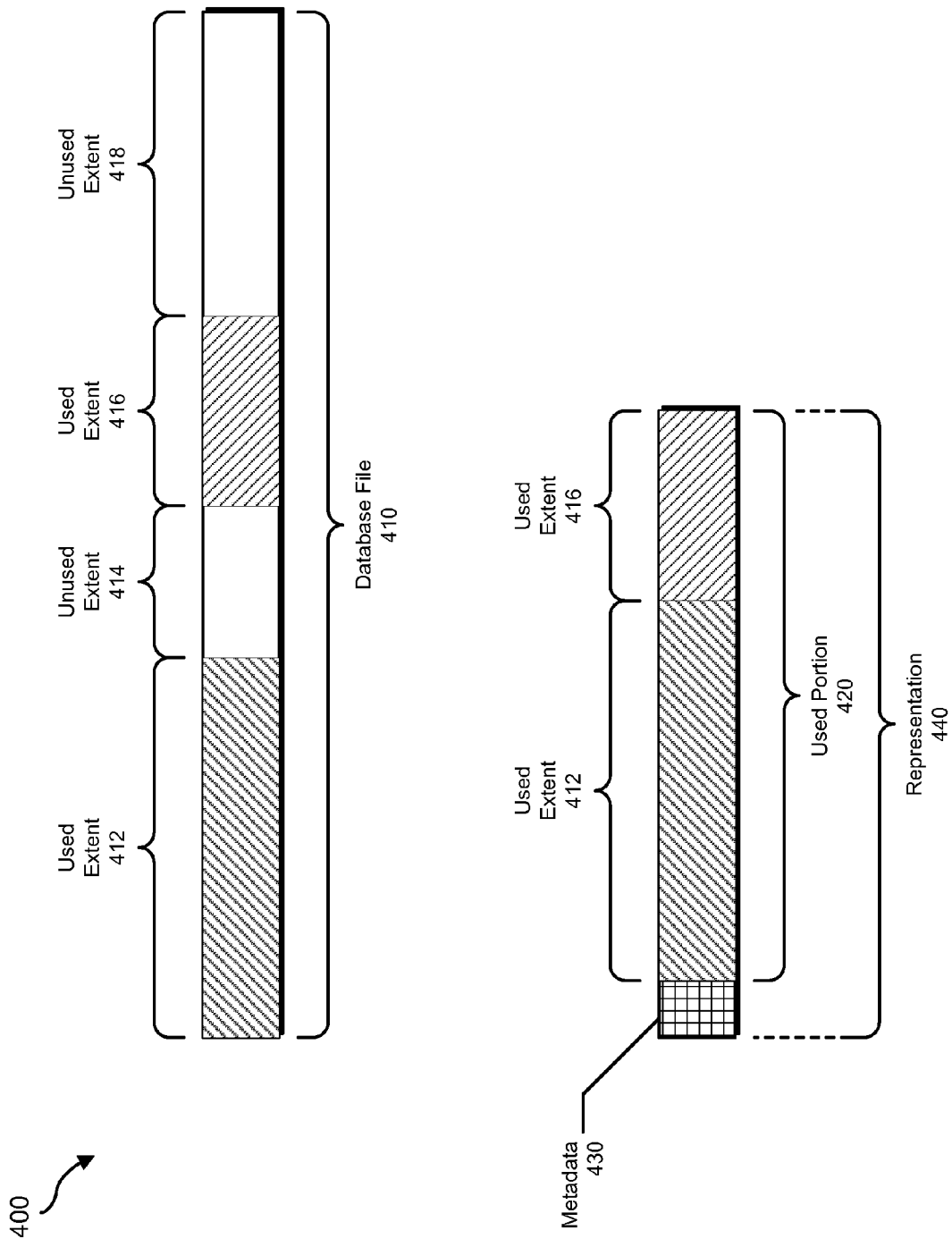
FIG. 4 is a block diagram of an exemplary database.

FIG. 4 illustrates an exemplary database 400 alternatively represented by a database file 410 and a representation 440 of database file 410. Using FIG. 4 as an example, at step 302 identification module 104 may identify a request to copy database file 410 to the target location.

Returning to FIG. 3, at step 304 one or more of the systems described herein may, in response to identifying the request to copy the database file to the target location, identify a preallocated but unused portion of the database file. For example, at step 304 preparation module 106 may, as part of computing device 202 in FIG. 2, in response to identifying request 220 to copy database file 210 to storage system 206, identify unused preallocated space 214 of database file 210.

As used herein, the phrase "preallocated but unused portion" as used in reference to a file generally refers to one or more blocks and/or extents allocated to the file within a file system for the potential future use of storing data within the file but which are not currently used for storing data within the file. For example, the preallocated but unused portion of the database file may not store any primary and/or useful information. Additionally or alternatively, the preallocated but unused portion of the database file may only store data to indicate that the preallocated but unused portion is unused. In some examples, the preallocated but unused portion of the database file may store duplicative and or residual data, but may nevertheless be available for storing new data.

Preparation module 106 may identify the preallocated but unused portion of the database file in any of a variety of ways. For example, preparation module 106 may identify the preallocated but unused portion of the database file by identifying a list of free extents within the database file. As used herein, the term "extent" may refer to any contiguous portion of storage allocated for a file. In some examples, a file may include several extents which may be located on various parts of a storage device. Accordingly, the phrase "free extent" as used herein may refer to any extent of a file available for storing new data designated for storage within the file.

The list of free extents may include any of a variety of information relating to the free extents. For example, information identifying an extent may include an address and/or offset of the extent. Additionally or alternatively, information identifying an extent may include a length of the extent. As used herein, the term "list" may generally refer to any data structure and/or format capable of storing and/or identifying one or more data items.

Using FIG. 4 as an example, database file 410 may include an unused extent 414 and an unused extent 418. Accordingly, at step 304 preparation module 106 may identify unused extent 414 and unused extent 418.

In some examples, preparation module 106 may identify the preallocated but unused portion of the database file by querying a database system for a list of unused blocks within the database file. As used herein, the term "block" may refer to any discrete unit of data. In some examples, the term "block" may refer to a fixed-size unit of data within a file. For example, the term "block" may refer to a block and/or sector. Preparation module 106 may additionally identify a block size used by the database. After receiving the list of unused blocks and identifying the block size, preparation module 106 may convert the list of unused blocks to a list of free extents within the database file based on the block size. For example, preparation module 106 may identify one unused block at offset 0x2F0100 within the database file and another unused block at offset 0x2F0200 within the database file. Preparation module 106 may also identify the block size used by the database as 0x000100. Preparation module 106 may accordingly determine that the two unused blocks are contiguous and convert the representation of the two unused blocks into a representation of a free extent at offset 0x2F0100 with a length of 0x000200.

In some examples, preparation module 106 may identify the preallocated but unused portion of the database file without reading each block of data within the preallocated but unused portion of the database file. For example, as described above, preparation module 106 may query a database system for metadata indicating which portions of the database file are preallocated but unused.

In addition to and/or as a part of identifying the preallocated but unused portion of the database file, preparation module 106 may generate a metadata representation of the preallocated but unused portion. As will be described in greater detail below, this metadata representation may be smaller than the preallocated but unused portion. Using FIG. 4 as an example, preparation module 106 may generate metadata 430 to represent unused extents 414 and 418.

Returning to FIG. 3, at step 306 one or more of the systems described herein may, in response to identifying the request to copy the database file to the target location, transmit a used portion of the database file to the target location. For example, at step 306 transmission module 108 may, as part of computing device 202 in FIG. 2, in response to identifying request 220 to copy database file 210 to storage system 206, transmit used space 212 of database file 210 to storage system 206.

Transmission module 108 may transmit the used portion of the database file to the target location in any of a variety of ways. For example, transmission module 108 may read data blocks from the used portion of the database file and transmit the used blocks to the target location. Additionally or alternatively, one or more of the systems described herein (e.g., preparation module 106) may have created a separate file containing the used blocks but not the preallocated and unused blocks. In this example, transmission module 108 may transmit the separate file to the target location.

In some examples, transmission module 108 may transmit the used portion of the database file to the target location in a discrete operation. For example, transmission module 108 may transmit the used portion of the database file to the target location as a part of backing up the database file to the target location, restoring the database file to the target location, and/or simply copying the database file to the target location. Additionally or alternatively, transmission module 108 may transmit the used portion of the database file to the target location in an ongoing operation. For example, transmission module 108 may transmit the used portion of the database file to the target location as a part of an online migration of the database file. In this example, the online migration may include transmitting updates to the database file (e.g., including updates to the used portion of the database file) to the target location. As another example, transmission module 108 may transmit the used portion of the database file to the target location as a part of a replication of the database file to the target location. In this example, transmission module 108 may also transmit updates to the database file (e.g., including updates to the used portion of the database file) to the target location.

Using FIG. 4 as an example, at step 306 transmission module 108 may transmit the used portion of the database file to the target location by transmitting used extents 412 and 416 of database file 410 to the target location. For example, transmission module 108 may read used extents 412 and 416 from database file 410 and transmit used extents 416 and 416 to the target location. Additionally or alternatively, transmission module 108 may transmit representation 440 (e.g., created by preparation module 106) to the target location, thereby transmitting used extents 412 and 416 to the target location.

As mentioned earlier, in some examples copying the database file to the target location may include an online migration of the database file to the target location. In these examples, one or more of the systems described herein (e.g., transmission module 108) may generate a time estimate for migrating the database file to the target location based on a size of the used portion of the database file. For example, transmission module 108 may discount the preallocated but unused portion of the database file when determining the effective size of the database file and estimating the time required to transmit the database file based on that effective size. By accurately estimating the time required to migrate the database file, the systems and methods described herein may make the online migration easier to schedule, prepare for, and/or execute.

Returning to FIG. 3, at step 308 one or more of the systems described herein may, in response to identifying the request to copy the database file to the target location, transmit a metadata representation of the unused portion of the database file to the target location, the metadata representation being smaller than the unused portion. For example, at step 308 transmission module 108 may, as part of computing device 202 in FIG. 2, in response to identifying request 220 to copy database file 210 to storage system 206, transmit metadata 230 representing unused preallocated space 214 to storage system 206.

The metadata representation of the unused portion of the database file may include any suitable representation of the unused portion. For example, the metadata representation of the unused portion may include free extent descriptions. In this example, the free extent descriptions may specify the address and/or offset of one or more free extents within the database file and, in some examples, the lengths of the one or more free extents. Using FIG. 4 as an example, metadata 430 may include an offset of unused extent 414 within database file 410 and a length of unused extent 414 within database file 410. Likewise, metadata 430 may include offset of unused extent 418 within database file 410 and a length of unused extent 418 within database file 410.

Transmission module 108 may transmit the metadata representation of the unused portion of the database file to the target location in any of a variety of ways. For example, transmission module 108 may transmit the metadata representation of the unused portion of the database file to the target location as a distinct data structure for receipt by a system configured to interpret the metadata representation as pertaining to the database file (e.g., and, therefore, to the used portions of the database file transmitted to the target location). Additionally or alternatively, transmission module 108 may transmit the metadata representation of the unused portion of the database file to the target location as a part of a file representing the database file in its original form. For example, one or more of the systems described herein (e.g., preparation module 106) may embed the metadata representation within the database file (e.g., a local copy of the database file with the unused portions removed) and transmission module 108 may transmit the metadata representation of the unused portion of the database file with the altered database file. Using FIG. 4 as an example, transmission module 108 may transmit metadata 430 as a part of representation 440.

In some examples, transmission module 108 may transmit the metadata representation of the unused portion of the database file and/or the used portion of the database file without transmitting some or all of the unused portion of the database file. For example, transmission module 108 may transmit only the used portion of the database file and the metadata representation of the unused portion of the database file to the target location, thereby potentially consuming fewer resources and/or time in transmitting a representation of the database file. After step 308, method 300 may terminate.

Figure 5:
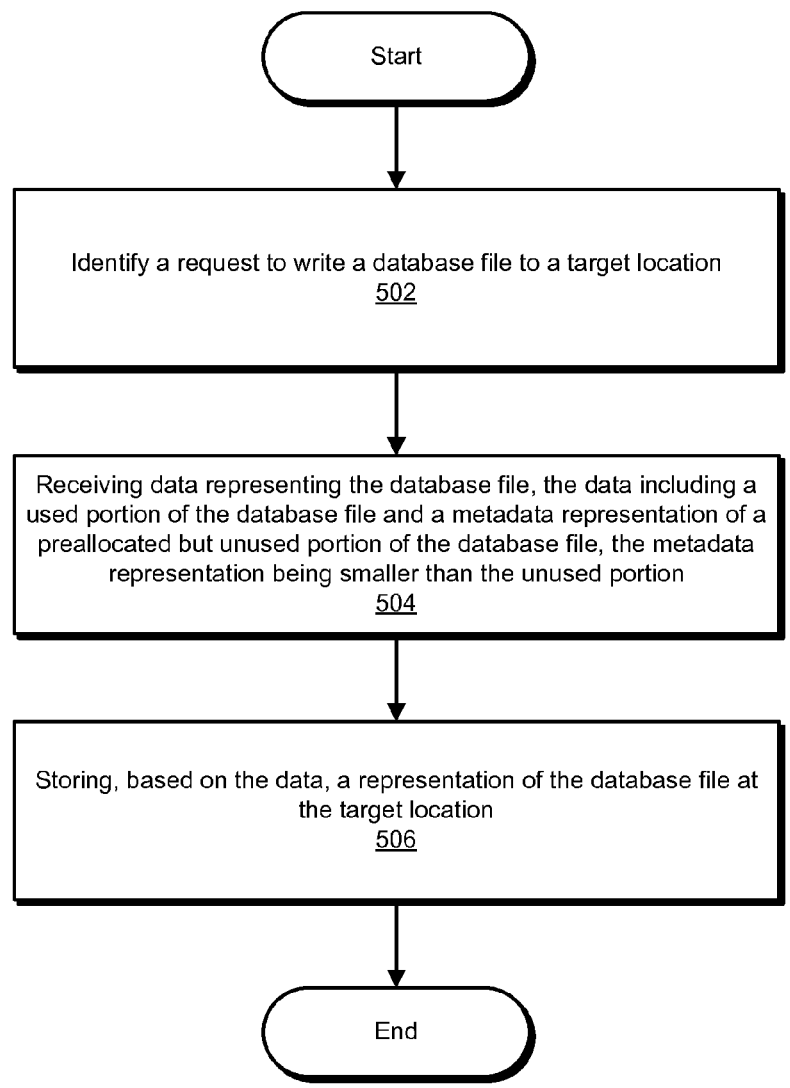
FIG. 5 is a flow diagram of an exemplary method for copying database files.

FIG. 5 is a flow diagram of an exemplary computer-implemented method 500 for copying database files. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, computing system 610 in FIG. 6, and/or portions of exemplary network architecture 700 in FIG. 7.

As illustrated in FIG. 5, at step 502 one or more of the systems described herein may identify a request to write a database file to a target location. For example, at step 502 receiving module 240 may, as part of storage system 206 in FIG. 2, identify request 220 to write database file 210 to storage system 206.

The request may include any of a variety of types of request. For example, receiving module 240 may identify the request by identifying a request to perform an online migration of the database file to the target location. In some examples, the request to write the database file may include a request to back up the database file. For example, receiving module 240 may identify a request to back up the database file to the target location. In some examples, the request to write the database file may include a request to restore the database file to the target location. For example, the database file may exist as a part of a backup, and the target location may represent an original location of the database file. In another example, the request to write the database file may include a request to replicate the database file. For example, the database file may be configured for replication to the target location in order to improve the reliability of accessing the database file.

In some examples, the request to write the database file may come as part of a request to move the database file. Accordingly, receiving module 240 may identify the request to write the database file to the target location by identifying a request to move the database file to the target location.

Receiving module 240 may identify the request in any of a variety of contexts. For example, receiving module 240 may operate as a part of a migration, backup, restoration, and/or copying application and receive the request. Additionally or alternatively, receiving module 240 may operate as a part of a file system filter driver and intercept one or more requests and/or operations to write the database file to the target location. Generally, receiving module 240 may identify any information indicating an instruction, attempt, and/or plan to write the database file.

Using FIG. 4 as an example, at step 502 receiving module 240 may identify a request to write a representation of database file 410 (e.g., representation 440) to the target location.

Returning to FIG. 5, at step 504 one or more of the systems described herein may receive data representing the database file, the data including a used portion of the database file and a metadata representation of a preallocated but unused portion of the database file, the metadata representation being smaller than the unused portion. For example, at step 504 receiving module 240 may, as part of storage system 206 in FIG. 2, receive used space 212 and metadata 230 collectively representing database file 210.

Receiving module 240 may receive the data representing the database file in any suitable manner. For example, receiving module 240 may receive an encoded data object representing the structure of the database including the used portion of the database file and the preallocated but unused portion. Additionally or alternatively, receiving module 240 may receive a file including the used portion of the database file and the metadata representation of the unused portion (but not, e.g., including the unused portion). Using FIG. 4 as an example, at step 504 receiving module 240 may receive representation 440 of database file 410 including a used portion 420 and metadata 430.

Returning to FIG. 5, at step 506 one or more of the systems described herein may store, based on the data, a representation of the database file at the target location. For example, at step 506 receiving module 240 may, as part of storage system 206 in FIG. 2, store a representation of database file 210 on the storage system 206.

Receiving module 240 may store any of a variety of representations of the database file at the target location. For example, receiving module 240 may store the raw data received representing the database file (e.g., the used portion of the database file and the metadata representation of the unused portion). In another example, receiving module 240 may reconstruct the database file at the target location by writing the used portion of the database file and allocating the unused portion within the database file based on the metadata representation. Using FIG. 4 as an example, in some examples receiving module 240 may store representation 440 at the target location. Additionally or alternatively, receiving module 240 may use representation 440 to reconstruct database file 410 at the target location. For example, receiving module 240 may, after receiving representation 440, write used extent 412, allocate unused extent 414, write used extent 416, and allocate unused extent 418 to the database file. Additionally or alternatively, receiving module 240 may reconstruct a functionally equivalent but restructured version of the database file. For example, receiving module 240 may write all used extents of the database continuously and allocate space totaling the combined space of the unused extents continuously. After step 506, method 500 may terminate.

As explained above, by copying used portions of database files along with metadata representations of the unused, preallocated portions, the systems and methods described herein may backup, restore, replicate, migrate, and/or otherwise copy database files more efficiently by reading, transmitting, and/or writing only those portions of the database files necessary to faithfully represent and/or reconstruct the database files.

Figure 6:
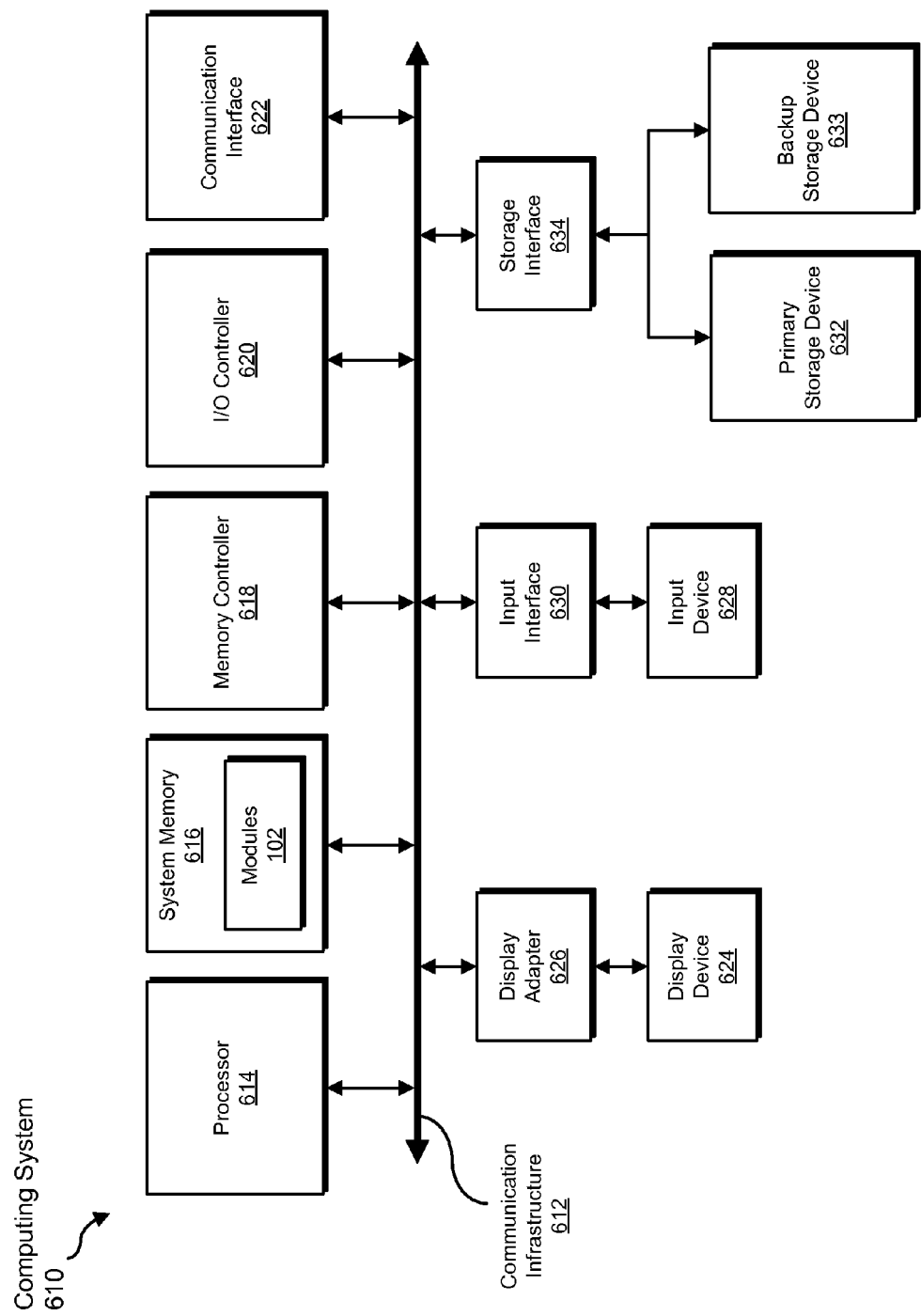
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, querying, converting, transmitting, generating, embedding, receiving, storing, and/or reconstructing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, querying, converting, transmitting, generating, embedding, receiving, storing, and/or reconstructing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760 (1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for copying database files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for efficiently copying database files. As another example, one or more of the modules recited herein may transform a database file into a data structure for efficiently transmitting databases.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for copying database files, at least a portion of the method being performed by a computing device comprising at least one processor, the method comprising:
   identifying a request to copy a database file to a target location;
   in response to identifying the request to copy the database file to the target location:
   identifying a preallocated but unused portion of the database file;
   transmitting a used portion of the database file to the target location;
   transmitting a metadata representation of the unused portion of the database file to the target location, the metadata representation being smaller than the unused portion.

2. The computer-implemented method of claim 1, wherein identifying the preallocated but unused portion of the database file comprises identifying a list of free extents within the database file.

3. The computer-implemented method of claim 1, wherein identifying the preallocated but unused portion of the database file comprises:
   querying a database system for a list of unused blocks within the database file;
   identifying a block size used by the database;
   converting the list of unused blocks to a list of free extents within the database file based on the block size.

4. The computer-implemented method of claim 1, wherein identifying the request comprises identifying a request to perform an online migration of the database file to the target location.

5. The computer-implemented method of claim 4, further comprising generating a time estimate for migrating the database file to the target location based on a size of the used portion of the database file.

6. The computer-implemented method of claim 1, wherein transmitting the metadata representation of the unused portion of the database file comprises embedding the metadata representation within the database file.

7. The computer-implemented method of claim 1, wherein identifying the request to copy the database file to the target location comprises identifying a request to at least one of:
   back up the database file to the target location;
   restore the database file to the target location;
   replicate the database file to the target location.

8. A computer-implemented method for copying database files, at least a portion of the method being performed by a computing device comprising at least one processor, the method comprising:
   identifying a request to write a database file to a target location;
   receiving data representing the database file, the data comprising a used portion of the database file and a metadata representation of a preallocated but unused portion of the database file, the metadata representation being smaller than the unused portion;
   storing, based on the data, a representation of the database file at the target location.

9. The computer-implemented method of claim 8, wherein storing the representation of the database file at the target location comprises storing the data at the target location.

10. The computer-implemented method of claim 8, wherein storing the representation of the database file at the target location comprises reconstructing the database file at the target location by writing the used portion of the database file and allocating the unused portion within the database file based on the metadata representation.

11. A system for copying database files, the system comprising:
   an identification module programmed to identify a request to copy a database file to a target location;
   a preparation module programmed to, in response to identifying the request to copy the database file to the target location, identify a preallocated but unused portion of the database file;
   a transmission module programmed to, in response to identifying the request to copy the database file to the target location:
   transmit a used portion of the database file to the target location;
   transmit a metadata representation of the unused portion of the database file to the target location, the metadata representation being smaller than the unused portion;
   at least one processor configured to execute the identification module, the preparation module, and the transmission module.

12. The system of claim 11, wherein the preparation module is programmed to identify the preallocated but unused portion of the database file by identifying a list of free extents within the database file.

13. The system of claim 11, wherein the preparation module is programmed to identify the preallocated but unused portion of the database file by:
- querying a database system for a list of unused blocks within the database file;
- identifying a block size used by the database;
- converting the list of unused blocks to a list of free extents within the database file based on the block size.

14. The system of claim 11, wherein the identification module is programmed to identify the request by identifying a request to perform an online migration of the database file to the target location.

15. The system of claim 14, wherein the preparation module is further programmed to generate a time estimate for migrating the database file to the target location based on a size of the used portion of the database file.

16. The system of claim 11, wherein the transmission module is programmed to transmit the metadata representation of the unused portion of the database file by embedding the metadata representation within the database file.

17. The system of claim 11, wherein the identification module is programmed to identify the request to copy the database file to the target location by identifying a request to at least one of:
- back up the database file to the target location;
- restore the database file to the target location;
- replicate the database file to the target location.

18. The system of claim 11, further comprising a receiving module programmed to:
- identify a request to write a database file to a target location;
- receive data representing the database file, the data comprising a used portion of the database file and a metadata representation of a preallocated but unused portion of the database file, the metadata representation being smaller than the unused portion;
- store, based on the data, a representation of the database file at the target location.

19. The system of claim 18, wherein the receiving module is programmed to store the representation of the database file at the target location by storing the data at the target location.

20. The system of claim 18, wherein the receiving module is programmed to store the representation of the database file at the target location by reconstructing the database file at the target location by writing the used portion of the database file and allocating the unused portion within the database file based on the metadata representation.

* * * * *